March 1, 1932.  J. W. MILNOR ET AL  1,848,022
POLAR RELAY
Filed Feb. 25, 1929   6 Sheets-Sheet 1

Inventors.
J. W. Milnor
F. B. Bramhall
E. A. Demonet

Eugene C. Brown
Attorney

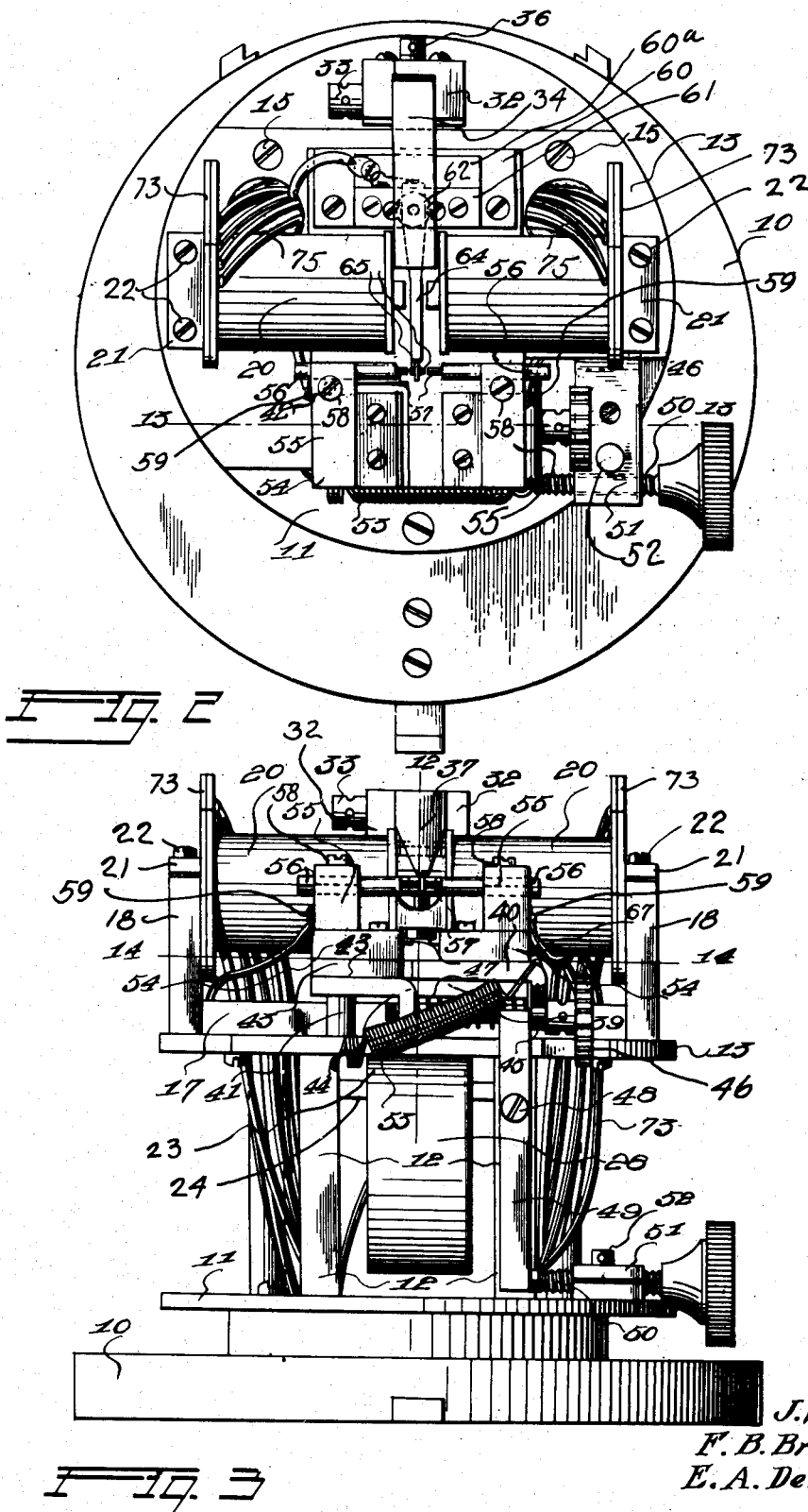

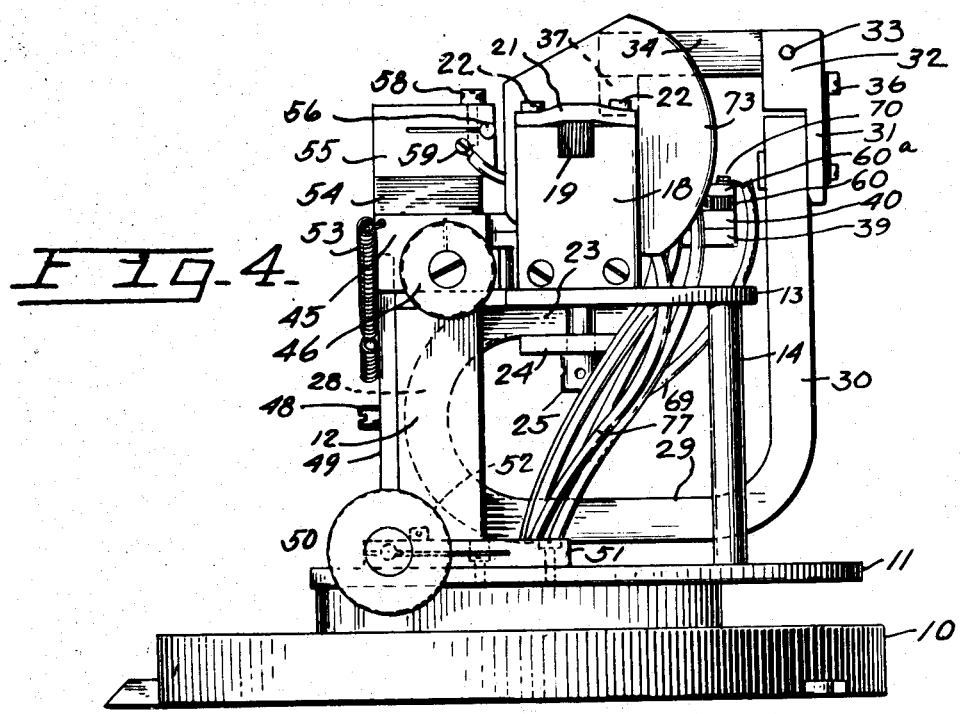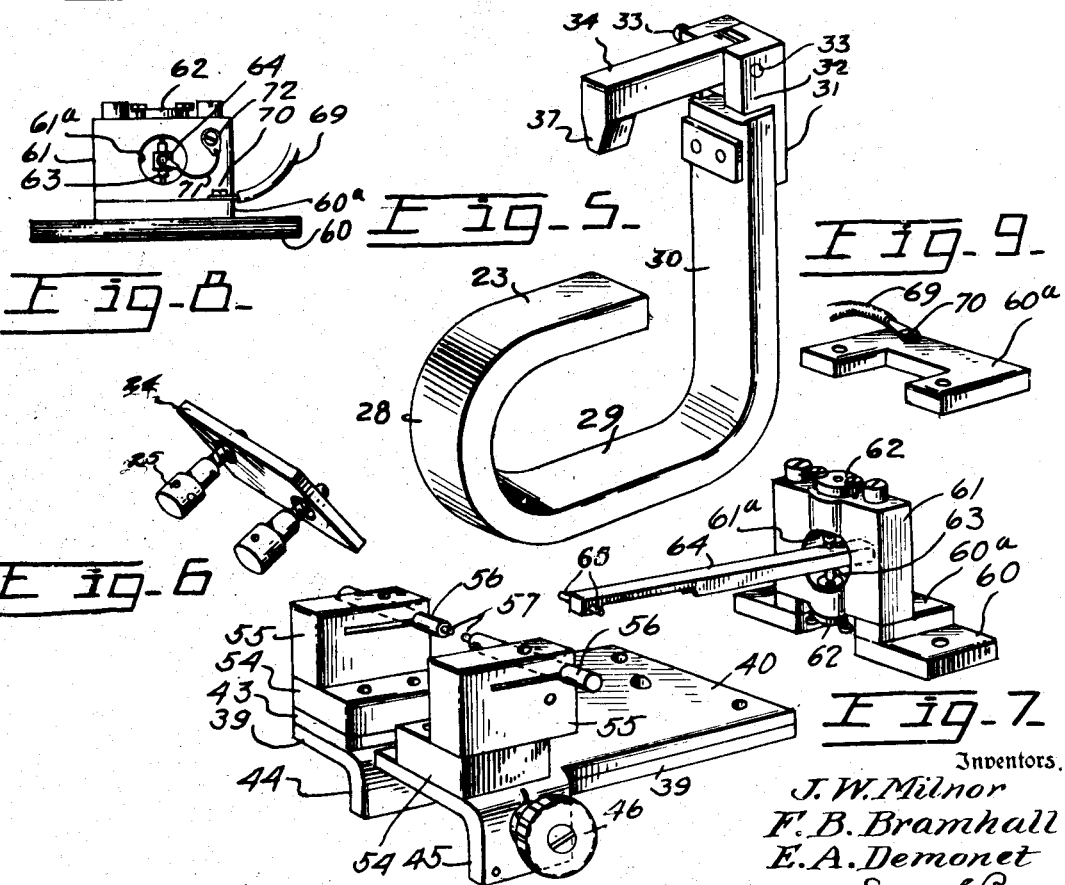

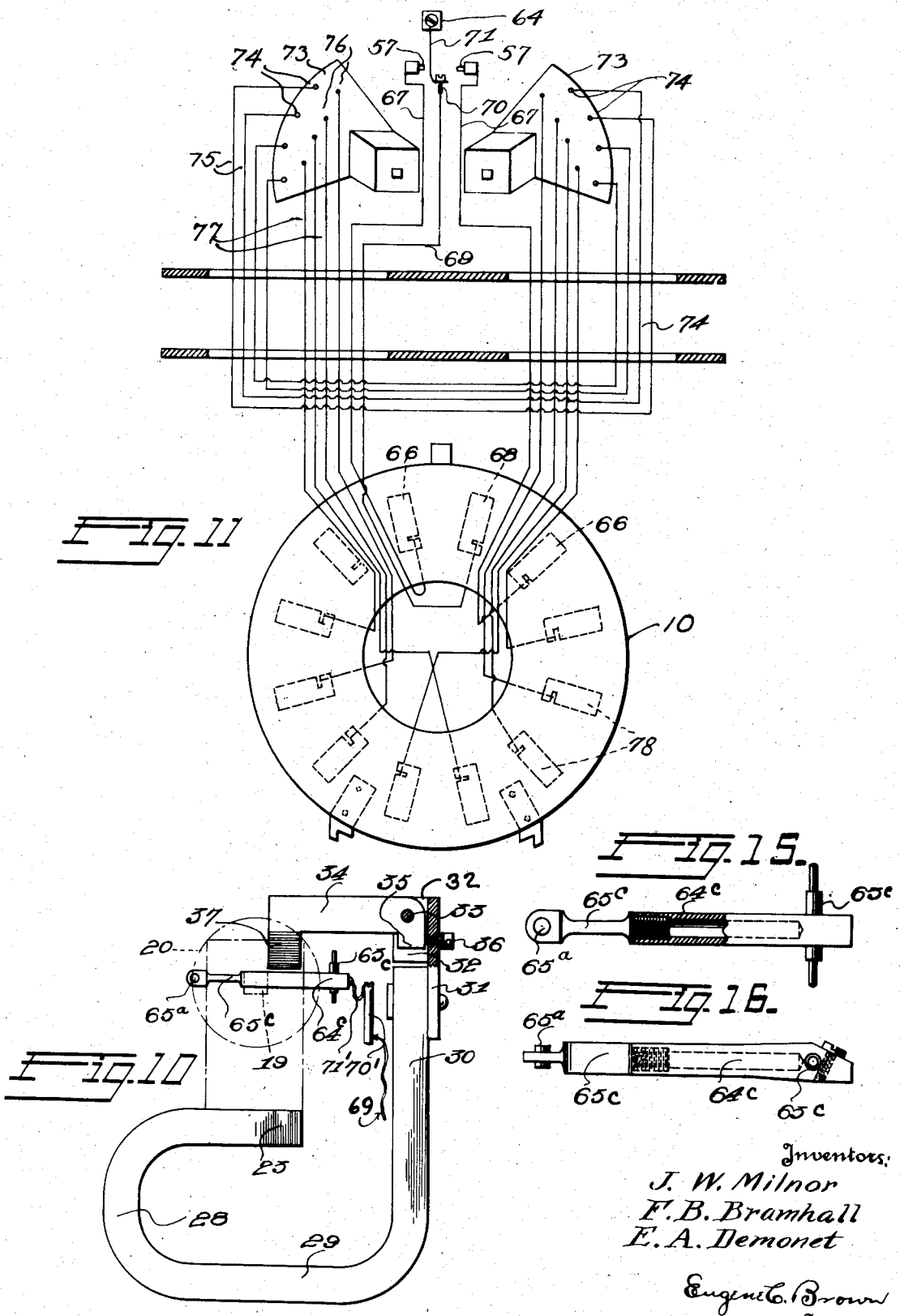

March 1, 1932.  J. W. MILNOR ET AL  1,848,022

POLAR RELAY

Filed Feb. 25, 1929  6 Sheets-Sheet 5

Inventors:
J. W. Milnor
F. B. Bramhall
E. A. Demonet
Eugene C. Brown
Attorney

Inventors:
J. W. Milnor
F. B. Bramhall
E. A. Demonet
Eugene C. Brown
Attorney

Patented Mar. 1, 1932

1,848,022

UNITED STATES PATENT OFFICE

JOSEPH W. MILNOR, OF MAPLEWOOD, NEW JERSEY, EUGENE A. DEMONET, OF BROOKLYN, NEW YORK, AND FAY B. BRAMHALL, OF METUCHEN, NEW JERSEY, ASSIGNORS TO THE WESTERN UNION TELEGRAPH COMPANY, OF NEW YORK, N. Y., A CORPORATION OF NEW YORK

POLAR RELAY

Application filed February 25, 1929. Serial No. 342,398.

This invention relates to electrical signalling and refers especially to a polarized relay peculiarly adapted for use in telegraphy.

Among the important objects of the invention are included the production of an improved and highly sensitive polarized relay having novel means for adjusting those parts in which adjustment is desirable; an improved arrangement of and support for the movable armature, improved means for inducing magnetism in the armature in such manner as to provide a strong magnetic field immediately between the poles of the magnets, and improved means for connecting the wiring of the magnets; as well as other objects as will hereinafter be set forth, reference being had to the accompanying drawings wherein:—

Figure 2 is a plan thereof.

Figure 3 is a front elevation thereof.

Figure 4 is a side view thereof.

Figure 5 is a perspective view of a permanent magnet and associated parts as used herein.

Figure 6 is a perspective view of a clamping plate used in connection with the permanent magnet.

Figure 7 is a partially disassembled perspective showing the circuit closer for the local circuit with certain associated parts.

Figure 8 is a rear view of a certain fulcrum or journal block used herewith and showing its supporting plate.

Figure 9 is a perspective of the supporting plate shown in Figure 8.

Figure 10 is a side elevation, partly diagrammatic of the permanent magnet and the movable contact.

Figure 11 is a wiring diagram of the invention.

Figure 15 is a side elevation, partly in section, of a modified form of armature and adapted to be used herewith.

Figure 16 is a plan view of the armature arm shown in Figure 15.

Figure 1:
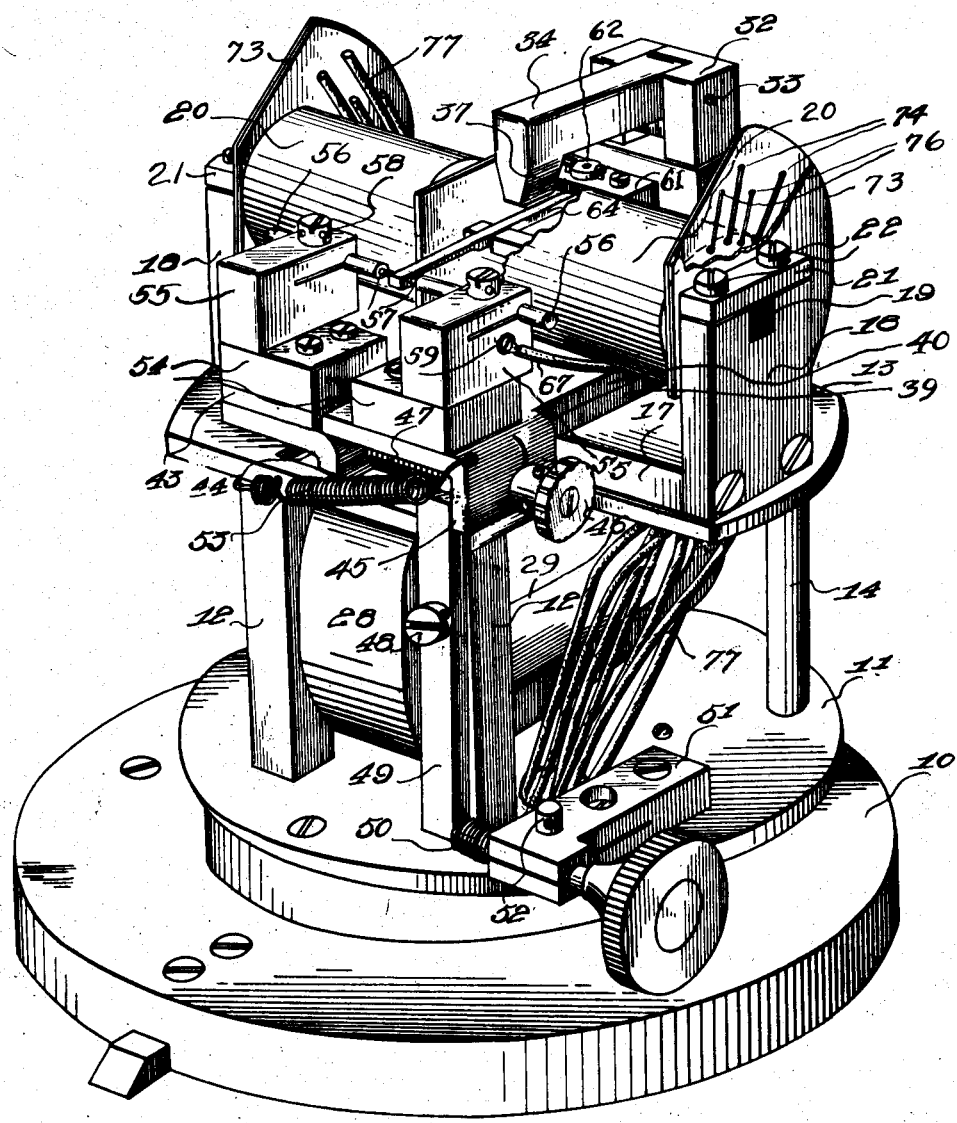
Figure 1 is a perspective view of the relay with the casing removed.
Figure 12:
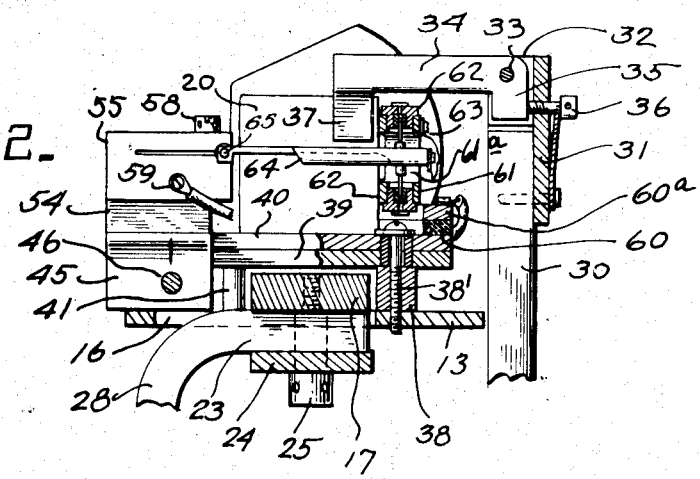
Figure 12 is a section on the line 12—12 of Figure 3.
Figure 13:
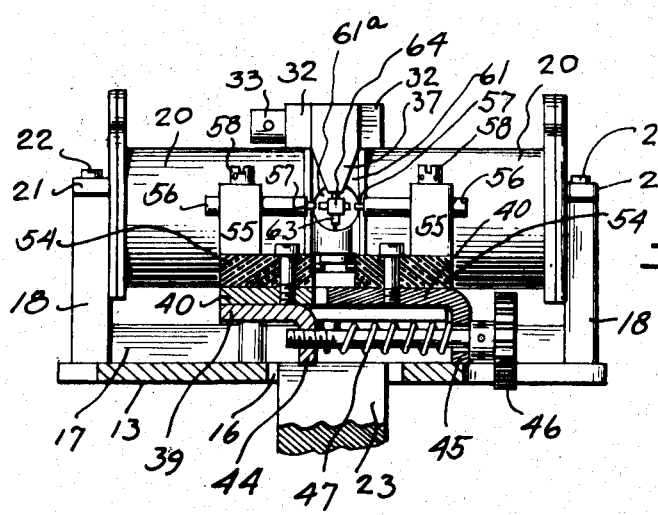
Figure 13 is a detail section on the line 13—13 of Figure 2.
Figure 14:
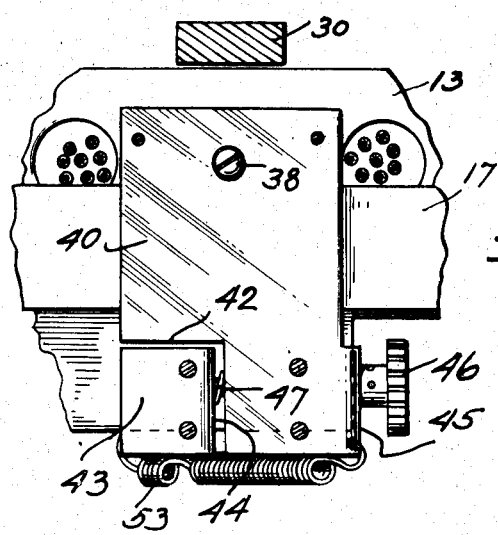
Figure 14 is a detail section on the line 14—14 of Figure 3.

In the present embodiment of the invention there is provided a base 10 of insulating material on which is mounted a lower frame plate 11. Extending upwardly from the front portion of the plate 11 is a pair of standards 12 which support the front of an upper frame plate 13, the rear being supported by a second pair of standards 14, screws 15 serving to secure the plate 13 to the standards. The plate 13 is slotted as at 16 and across this slot extends a bar 17 of iron which has pole pieces 18 fixed to and extending upwardly from its ends and each of which has a square notch in its upper end receiving the end 19 of the laminated core of a respective magnet 20. Caps 21 are held on these pole pieces by screws 22 and serve to retain the core ends in position.

The bar 17 is secured to the plate 13 by suitable screws and bearing against the center of the lower surface of this bar is one end 23 of a permanent magnet which is secured in position by a clamp plate 24 mounted beneath the plate 13 by the screws 25. The permanent magnet extends forwardly and then downwardly between the standards 12 as shown at 28. This magnet then extends rearwardly as at 29 and terminates in a vertical portion 30 which passes up behind the plate 13. On the upper end of the part 30 is fixed an iron extension 31 having spaced and forwardly directed ears 32 between which is mounted, on a horizontal clamping pivot screw 33, the angled portion of an L-shaped pole piece having a horizontal arm 34 and a vertical arm 35 against which bears an adjusting screw 36 so that the forward end of the arm 34 may be vertically adjusted. The forward end of this arm 34 is provided with a tapered downwardly extending terminal portion or pole 37 the purpose of which will be presently understood.

Mounted on the rear of the plate 13 is a pivot post 38 whereto is pivoted by means of a screw 38' the rear end of a plate 39 and on top of the plate 39 is an upper plate 40 also pivoted on the post 38 but movable independently of the plate 39. These plates extend forwardly beneath the magnets 20 and the lower plate rests on and is supported by a post 41 mounted on the frame plate 13. The upper plate has its left hand forward corner cut away to provide a notch or rabbet 42 so that a filler member or distance piece 43 of the same thickness as the upper plate 40 may be secured to the lower plate at this place. The lower plate 39 has its right hand front corner cut and bent to provide a downwardly extending lug 44 and the upper plate 40 is likewise provided with a downwardly extending lug 45. Through the lug 45 passes the shank of an adjusting screw 46, the head bearing against the outer face of the lug 45 and the point being threaded through the lug 44. A spring 47 surrounds the shank of the screw 46 and tends to force the lugs 44 and 45 apart, this tendency being resisted by the screw 46. By rotating this screw, it is obvious that the lugs may be adjusted in spatial relation.

Pivoted at 48 on the front face of the right hand standard 12 is a lever 49 having an upper arm bearing against the inner face of the lug 45. The lower arm of this lever is engaged by an adjusting screw 50 which is screwed through the split portion of a split bracket 51 and a clamping screw 52 is provided to compress the split portion and hold the adjusting screw from accidental displacement from adjusted position. A coiled tension spring 53, having one end secured to the lug 45 and its other end secured to the left hand standard 12, holds the lug 45 in contact with the upper end of the lever 49. By this arrangement, movement of the screw 50 provides a right and left adjustment of the plates 39 and 40 simultaneously.

On the front end of the plate 40 and on the spacer 43 are mounted insulating blocks 54 and on these in turn are fixed brackets 55 of conducting material which have their rear ends drilled and split for the reception of alined rods 56 having their adjacent ends spaced and provided with spaced contact terminals 57. Clamp screws 58 serve to compress the split portions on the rods 56 and thus hold these rods in position after adjustment for distance from each other. Wire terminals are secured to the brackets 55 by screws 59.

Mounted on the rear end of the plate 40 is a plate 60 of insulating material and on this plate is carried a metallic plate 60a which in turn supports a jewel housing 61 having an opening 61a at the top and bottom of which are the vertically alined jeweled bearings 62 which receive the ends of a staff 63 which is alined with the post 38 and carries a forwardly extending channeled iron armature arm 64, the front end of which lies between the adjacent ends of the magnet cores 19, so that it may swing in accordance with the energization of these magnet cores. Moreover, this armature lies very close beneath the pole 37 of the pivoted extension of the permanent magnet so that a highly effective magnetization is induced in this armature closely adjacent its free end. The forward end of this armature arm carries the contacts 65 positioned between the contact terminals 57. This concentrated magnetic field adjacent the end of the armature and in close proximity thereto not only causes the relay to respond to very feeble currents, but at the same time to be very positive and prompt in action.

In adjusting the instrument a rough adjustment of the contacts 57 may first be made by bringing them both into engagement with the contacts 65. Then the contacts 57 may be opened the required distance by manipulating the screw 46, after which they may be moved simultaneously to proper position by the screw 50 so that the contacts 65 are properly centered. The plates 39 and 40 which carry the contacts 57 are pivoted on the post 38 and this is in alinement with the armature pivot stem 63, hence the contacts 65 and the contacts 57 move in the same arc. The contacts will therefore wear evenly and good electrical contact will be maintained.

The armature arm 64 and its jeweled bearings 62 are mounted in a separate housing 61 and these parts may therefore be quickly removed as a unit and replaced by a corresponding unit if the jewels become defective or worn without the necessity of shipping the entire relay back to the factory.

On the bottom of the base 10 are mounted a pair of terminal lugs 66 connected by wires 67 with the brackets 55 and thus with the contact terminals 57. A third lug 68 is connected by a wire 69 with a terminal screw 70 screwed into the plate 60a. Also the rear end of the arm 64 is connected by a fine wire 71 with a terminal screw 72 on the jewel housing 61. Thus the armature arm and its contacts are connected to the lug 68. The magnets 20 are wound in sections and at the outer end of each magnet is a pair of insulating plates 73 so that one terminal of each section winding can be brought out through the inner plate 73 as at 74 and connected by a wire 75 with the corresponding terminal of the other magnet. Furthermore, the remaining terminal of each magnet is brought out through the inner plate as at 76 and these terminals are connected by the wires 77 with lugs 78 on the bottom of the plate 10. By this arrangement a current path is established between one of said lugs, to a winding on one magnet and from thence to the corresponding winding on the other magnet back to a second lug 78.

In Figures 15 and 16 there is shown a modified form of armature arm the relation of which to the other parts is likewise illustrated in Figure 10. In this modified armature arm a staff 63c supports an arm consisting of an inner tubular section 64c into the forward end of which is screwed a finger 65c carrying contact points 65a. A wire 71' connects the arm 64 with a suitable post 70' to which the wire 69 may be connected.

Figure 17:
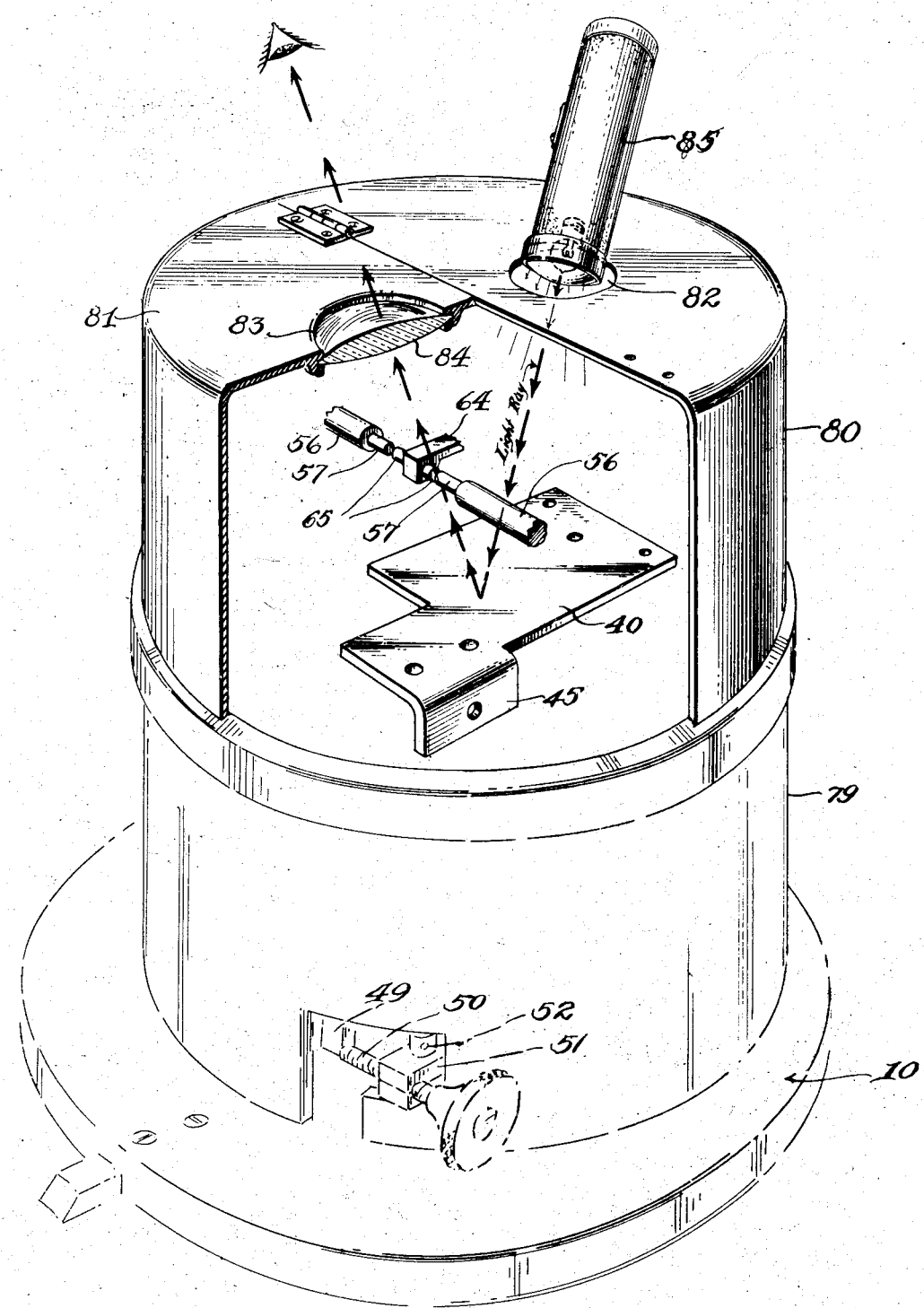
Figure 17 is a perspective view, partly broken away and disclosing a form of casing arrangement by which adjustment of the contacts for the local circuit may be observed without removing the casing.

In Figure 17 there is shown an arrangement by means of which the adjustment of the contacts 57 and 65a may be observed without removing the casing. In this arrangement the casing consists of a lower section 79 and an upper section having a rear half 80 and a front half 81 hinged thereto. In the top of the rear half 80 is a window opening 82 and a similar opening 83 at the top of the front half is provided with a lens 84. It is to be noted that the plate 40 is a polished plate. Now, without lifting the section 81 a flashlight 85 may have its beam directed down onto the plate 40 whence it will be reflected upwardly through the lens 84 and this ray of light will thus pass the contacts 57 and 65a so that the positions of these may be observed and adjusted by the screw 50 which projects from the lower part of the casing 79.

Having thus described the invention, what is claimed as new, is:

1. In a relay, a movable contact arranged to swing on a fixed axis, a pair of normally fixed and spaced contacts movable for adjustment about the said axis and positioned on opposite sides of the movable contact, means to vary the spacing between said normally fixed contacts and other means to swing both fixed contacts simultaneously about said axis.

2. In a relay, a pivot post, a pair of plates pivoted to said post for independent pivotal movement thereon, movable contact bearings alined above the post, a movable contact arm pivoted in the bearings and extending over said plates, a pair of contacts each fixed to a respective plate and positioned on a respective side of the movable contact arm, means to move one of said plates about the pivot with respect to the other whereby to vary the spacing of said fixed contacts, and other means to move said plates simultaneously about said pivot whereby the movable contact may be centered between the pair of contacts.

3. In a relay, a pivot post, a pair of plates pivoted to said post for independent pivotal movement thereon, movable contact bearings alined above the post, a movable contact arm pivoted in the bearings and extending over said plates, a pair of contacts each fixed to a respective plate and positioned on a respective side of the movable contact arm, spaced lugs on the free ends of said plates, an adjusting screw passing through said lugs to regulate the spacing of the lugs and thereby vary the spacing of the fixed contacts, and means to move said plates, lugs and screw simultaneously about said pivot whereby the movable contact may be centered between the pair of contacts.

4. In a relay, a pivot post, a pair of plates pivoted to said post for independent pivotal movement thereon, movable contact bearings alined above the post, a movable contact arm pivoted in the bearings and extending over said plates, a pair of contacts each fixed to a respective plate and positioned on a respective side of the movable contact arm, spaced lugs on the free ends of said plates, an adjusting screw passing through said lugs to regulate the spacing of the lugs and thereby vary the spacing of the fixed contacts, a lever pivoted intermediate its ends and having one end engaging one of said lugs, an adjusting screw engaging the remaining end of said lever, and a spring holding the last mentioned lug against said lever.

5. In a polarized relay, a pair of relay magnets having alined and spaced cores, a movable contact arm pivoted to extend between said cores and forming an armature for said magnets, a permanent magnet having a pole extending over the armature in close inductive relation to the armature adjacent the cores, and means to adjust said pole toward and from the armature.

6. In a polarized relay, a pair of relay magnets having alined and spaced cores, a movable contact arm pivoted to extend between said cores and forming an armature for said magnets, a permanent magnet, and an iron extension from one pole of said permanent magnet in magnetic contact with said pole and extending forwardly over the armature, said extension terminating in a pole in close inductive relation to the armature adjacent said cores.

7. In a polarized relay, a pair of relay magnets having alined and spaced cores, a movable contact arm pivoted to extend between said cores and forming an armature for said magnets, a permanent magnet, an iron extension from one pole of said permanent magnet in magnetic contact with said pole and extending forwardly over the armature, said extension terminating in a pole in close inductive relation to the armature adjacent said cores, and means to vary the inductive relation between the extension pole and the armature.

8. In a polarized relay, a pair of relay magnets having alined and spaced cores, a movable contact arm pivoted to extend between said cores and forming an armature for said magnets, a permanent magnet, an iron extension pivoted to one pole of said permanent magnet in magnetic contact therewith and extending forwardly over the armature, said extension having a pole in close magnetic relation to the armature adjacent said cores, and an adjusting screw engaging the extension to move it on its pivot and thereby vary the distance of said extension pole from the armature.

9. In a relay having a pair of normally fixed contacts, a removable unit comprising an arm provided at one end with a contact adapted to engage said fixed contacts alternately, a bracket having a block portion provided with an aperture forming a housing and carrying bearings spaced apart, and a stem secured to the other end of said arm and mounted in said bearings.

10. In a polarized relay, a pair of alined electro-magnets having sectional windings, an insulating plate at the outer end of each magnet having openings therein through which the terminals of the respective magnet windings are led, said plates each having other openings through which the terminals of conductor wires may be led for connection to the magnet winding terminals, and cover plates covering the exteriors of the first mentioned plates and formed of insulating material whereby to protect and insulate the terminal wire connections.

In testimony whereof, we affix our signatures.

JOSEPH W. MILNOR.
EUGENE A. DEMONET.
FAY B. BRAMHALL.